US011341603B2

United States Patent
Pinatel et al.

(10) Patent No.: US 11,341,603 B2
(45) Date of Patent: May 24, 2022

(54) ELECTRONIC IMAGE PROCESSING DEVICE

(71) Applicants: STMicroelectronics (Grenoble 2) SAS, Grenoble (FR); STMicroelectronics (Rousset) SAS, Rousset (FR)

(72) Inventors: Christophe Pinatel, Gareoult (FR); Serge Mazer, St-Jean-de-Moirans (FR); Olivier Ferrand, Carry le Rouet (FR)

(73) Assignees: STMICROELECTRONICS (GRENOBLE 2) SAS, Grenoble (FR); STMICROELECTRONICS (ROUSSET) SAS, Rousset (FR)

(*) Notice: Subject to any disclaimer, the term of this patent is extended or adjusted under 35 U.S.C. 154(b) by 176 days.

(21) Appl. No.: 16/810,486

(22) Filed: Mar. 5, 2020

(65) Prior Publication Data
US 2020/0302570 A1   Sep. 24, 2020

(30) Foreign Application Priority Data
Mar. 22, 2019 (FR) .................................. 1902966

(51) Int. Cl.
*G06T 1/60* (2006.01)
*G06N 20/00* (2019.01)
(Continued)

(52) U.S. Cl.
CPC .............. *G06T 1/60* (2013.01); *G06K 9/6256* (2013.01); *G06N 20/00* (2019.01); *G06T 1/20* (2013.01); *G06V 10/25* (2022.01)

(58) Field of Classification Search
CPC . G06T 1/60; G06T 1/20; G06N 20/00; G06N 3/0454; G06K 9/3233; G06K 9/6256;
(Continued)

(56) References Cited

U.S. PATENT DOCUMENTS

| 10,225,511 | B1* | 3/2019 | Lim ..................... H04N 9/8042 |
| 2004/0054837 | A1* | 3/2004 | Biran .................. G06F 13/4022 |
| | | | 710/305 |

(Continued)

OTHER PUBLICATIONS

Hegarty, James et al., "Darkroom: Compiling High-Level Image Processing Code into Hardware Pipelines", ACM Transactions on Graphics, vol. 33, No. 4. Article 144, Jul. 2014, 11 pages.
(Continued)

*Primary Examiner* — Jennifer Mehmood
*Assistant Examiner* — Kim Thanh T Tran
(74) *Attorney, Agent, or Firm* — Slater Matsil, LLP (57) ABSTRACT

An image processing electronic device includes a pipeline configured to process frames of image data; an internal memory coupled to the pipeline, wherein a set of descriptors arranged according to an order is stored in the internal memory, each descriptor of the set of descriptors is associated with a corresponding function to be activated by the pipeline on at least one frame of image data; a controller configured to read each descriptor of the set of descriptors sequentially and cyclically according to the order at a rate of at least one descriptor per one frame of image data and store information corresponding to each read descriptor, wherein the pipeline is configured to activate on each frame of image data, the function associated with each read descriptor based on the stored information.

20 Claims, 5 Drawing Sheets

(51) Int. Cl.
*G06K 9/62* (2022.01)
*G06T 1/20* (2006.01)
*G06V 10/25* (2022.01)

(58) Field of Classification Search
CPC ............ G06K 9/00664; H04N 7/0117; G07G 1/0072; G01G 19/414; G01G 23/18; G06V 10/25; G06V 20/10
USPC .......................................................... 345/531
See application file for complete search history.

(56) References Cited

U.S. PATENT DOCUMENTS

| | | | | |
|---|---|---|---|---|
| 2012/0268655 | A1* | 10/2012 | MacInnis | G06F 16/9577 |
| | | | | 348/584 |
| 2014/0189666 | A1* | 7/2014 | Krig | G06F 8/456 |
| | | | | 717/160 |
| 2015/0347859 | A1* | 12/2015 | Dixon | G06K 9/186 |
| | | | | 382/138 |
| 2016/0283801 | A1 | 9/2016 | Okumura | |
| 2017/0076145 | A1* | 3/2017 | Gottemukkula | G06K 9/4642 |
| 2018/0114290 | A1* | 4/2018 | Paltashev | G06T 1/20 |
| 2018/0189981 | A1* | 7/2018 | Singh | G06N 3/08 |
| 2020/0226776 | A1* | 7/2020 | Toma | G06T 7/593 |
| 2020/0272841 | A1* | 8/2020 | Han | A61B 5/1073 |

OTHER PUBLICATIONS

Kneip, Johannes et al., "Single-chip highly parallel architecture for image processing applications", SPIEDigitalLibrary.org/conference-proceedings-of-spie, Sep. 16, 1994, 13 pages.

\* cited by examiner

ELECTRONIC IMAGE PROCESSING DEVICE

This application claims priority to French Patent Application No. 1902966, filed on Mar. 22, 2019, which application is hereby incorporated herein by reference in its entirety.

TECHNICAL FIELD

Embodiments of the invention relate to electronic devices, more particularly electronic devices for image processing including processing chains, more commonly called pipelines.

BACKGROUND

Generally, an image processing electronic device includes several pipelines intended to receive a stream of image data coming from an image capturing apparatus like a camera.

Depending on envisaged uses, several pipelines are generally necessary for processing image data such as to adapt it for subsequent processing, for example undertaking resizing and cropping of the image data for screen displays, static analysis of raw images in "RAW" file format, or recording of high-quality and high-definition images.

Thanks to increasingly greater computing powers associated with cameras that can particularly be integrated into mobile electronic apparatuses such as smart phones, it now becomes possible to apply artificial intelligence (AI) algorithms in real time to image data coming from the cameras.

For this purpose, several pipelines are conventionally used in parallel to generate suitable image data such as to deliver it to one or more artificial neural networks in order to, for example, identify regions of interest in this image data.

However, such processing is generally based on a high-quality image saved in an external memory located outside the electronic device since the saved image is generally too large to be stored locally.

Several pipelines are configured to respectively carry out intermediate separate pre-processing such as pre-processing of the saved image in order to generate a new low-resolution image suited to so-called artificial intelligence processing, for example processing for identifying one or more regions of interest, pre-processing of the area or areas of interest identified for processing for recognizing objects in the identified area or areas of interest, and pre-processing the saved image in order to display the saved image and/or the identified areas of interest in low definition.

Nevertheless, this intermediate separate pre-processing requires additional intermediate buffer memories and large bandwidths between the electronic device and the external memory, which generally leads to an extremely high cost particularly with regard to the occupied silicon surface area and the energy consumption.

Moreover, as some pre-processing operations depend directly on results output from other pre-processing operations, there is a risk of accumulation of the latencies spread throughout all of these pre-processing operations.

Thus, there is a need to propose a low complexity, small silicon surface area and low energy consumption technical solution that makes it possible to undertake, virtually in real time, pre-processing and processing of images without any intermediate buffer memory.

SUMMARY

In accordance with an embodiment, an image processing electronic device includes: a pipeline configured to process frames of image data in pace with a frame rate; an internal memory coupled to the pipeline, where a set of descriptors arranged according to an order is stored in the internal memory, each descriptor of the set of descriptors is associated with a corresponding function to be activated by the pipeline on at least one frame of image data, where a first function associated with a first descriptor of the set of descriptors is different from a second function associated with a second descriptor of the set of descriptors; and a controller configured to: read each descriptor of the set of descriptors sequentially and cyclically according to the order at a rate of at least one descriptor per one frame of image data, and store information corresponding to each read descriptor, where the pipeline is configured to activate on each frame of image data, the function associated with each read descriptor based on the stored information.

In accordance with another embodiment, a method includes receiving frames of image data by a pipeline; reading descriptors of a set of descriptors sequentially and cyclically according to an order from an internal memory, wherein each descriptor of the set of descriptors is associated with a function of a set of functions; sequentially and cyclically storing information corresponding to each read descriptor of the set of descriptors; and configuring the pipeline to perform the function associated with the read descriptor on each frame of the image data.

In accordance with a further embodiment, An image processing system includes: an integrated circuit that has at least one pipeline circuit having an input configured to be coupled to an output of a camera, and configured to be coupled to an external memory; an internal memory coupled to the at least one pipeline circuit; a controller coupled to the pipeline circuit and to the internal memory, the controller configured to cause the at least one pipeline circuit to create a plurality of scheduled virtual pipelines by sequentially reading descriptors stored in the internal memory, where a first virtual pipeline is configured to generate a first image based on a frame of image data and store the first image in the internal memory, and a second virtual pipeline is configured to generate a second image based on the frame of image data and write the second image to the external memory, where a resolution of the first image is less than a resolution of the second image; and a processor coupled to the internal memory, where the processor configured to implement a neural network, and the neural network is configured to perform apply a neural network recognition algorithm to the stored first image in the internal memory.

BRIEF DESCRIPTION OF THE DRAWINGS

Other advantages and features of the invention will emerge upon examining the detailed description of embodiments, which are in no way limiting, and the appended drawings wherein.

DETAILED DESCRIPTION OF ILLUSTRATIVE EMBODIMENTS

According to one aspect, an embodiment image processing electronic device is proposed. The electronic device comprises at least one pipeline, each pipeline being intended to process frames of image data in pace with a frame rate; an internal memory including, for each pipeline, a set of descriptors that are arranged according to an order, each descriptor including information relating to a function intended to be activated by the corresponding pipeline on at least one frame of image data, the functions associated with the various descriptors being different, and a controller configured, for each pipeline, to read the corresponding set of descriptors sequentially and repetitively in the order at the rate of one of the descriptors per frame of image data and store the information corresponding to the read descriptor, each pipeline being configured to activate, on each frame of image data, the function corresponding to the stored information.

Each pipeline of the electronic device is advantageously configured to activate a function corresponding to the information of one of the descriptors per frame of image data according to the order. As the information of the descriptors is different, the corresponding functions are also different. In other words, each pipeline is configured to sequentially and cyclically activate the various functions in pace with the frame rate.

The sequential and cyclical reading of the set of descriptors is undertaken at the rate of one descriptor per one frame of data at least. Indeed, it is possible to have one descriptor per frame or one descriptor valid for several frames (wherein the number of frames can be programmed by the user within the descriptor). In other words, when there is one descriptor per frame, for a current frame of data, one descriptor is read. Then, for the following frame of data, the following descriptor as per the order is read. This continues until the last descriptor of the set of descriptors is read. When one descriptor is valid for several frames, the corresponding number of frames is awaited before reading the following descriptor as per the order.

Once the information of the last descriptor of the set according to the order is read, the controller is configured to read, for the next frame of image data, the information of the first descriptor of the descriptor set according to the order and repeat the cycle. As a result, each pipeline thus creates several "virtual" pipelines operating in time-division multiplexing mode in pace with the frame rate.

Advantageously, a single pipeline can already be sufficient to process all of the frames of image data and no intermediate buffer memory is necessary, which considerably reduces the manufacturing costs, the occupied silicon surface area and the energy consumption of the electronic device.

It should be noted that it is also possible to use any number of physical pipelines in order to create any number of "virtual" pipelines depending on the anticipated performance. Furthermore, the fact that the "virtual" pipelines can operate independently in time-division multiplexing mode makes it possible to avoid possible latencies linked to the dependent pre-processing operations described above.

According to an embodiment, the controller further includes, for each pipeline, a shadow memory and a register. The controller is further configured to, for each pipeline, read, between the end of the previous frame of image data and the end of the current frame of image data, one of the descriptors and then store the corresponding information in the shadow memory, and transfer the stored information from the shadow memory to the register, from the end of the current frame of image data. The corresponding pipeline is configured to activate the function corresponding to the information stored in the register from the start of the next frame of image data.

Such a use of the shadow memory advantageously makes it possible to asynchronously load, following the end of the previous frame of image data but before the end of the current frame of image data, the information of the next descriptor according to the order. As the transfer of data between the shadow memory and the register is intrinsically fast, the information of the next descriptor according to the order is advantageously transferred to the register from the end of the current frame of image data such as to make it possible to synchronously activate the corresponding function by the corresponding pipeline from the start of the next frame of image data. As a result, all of the processing of the frames of image data can advantageously be executed on-the-fly without requiring intermediate memories since frames of image data can directly be cut to sizes and/or to resolutions desired for subsequent processing.

According to an embodiment, the controller may include a control circuit, such as a direct memory access (DMA) controller.

Advantageously, no central processing unit (CPU) or no user intervention is necessary since all functions to be activated in the frames of image data are saved as information in the set of descriptors that are arranged according to the order. Furthermore, no central processing unit is necessary to reconfigure the pipeline or to transfer the data when using a DMA system.

According to yet another embodiment, the direct memory access controller is an integrated controller dedicated to the at least one pipeline. Such an embodiment furthermore makes it possible to reduce the occupied silicon surface area of the electronic device.

As an example that is not however limiting, the frame rate can be configurable, for example. In other words, a user of the electronic device can advantageously set the frame rate in order to obtain a desired performance of the electronic device according to envisaged uses.

Furthermore, the number of descriptors of each set of descriptors and the order can, for example, also be configurable. It should be noted that not only the relative position of each descriptor but also the number of repetitions of each descriptor in each set of descriptors that are arranged according to the order are configurable such as to allow possibilities for creating any combination of the pipeline functions.

In an indicative but non-limiting manner, the electronic device further includes a processor configured to implement one or more artificial neural networks coupled to the at least one pipeline. This processor makes it possible, for example, to identify areas of interest and to recognize possible objects featuring in these areas of interest, particularly for applications of artificial intelligence (AI).

The electronic device can, for example, further include a display controller coupled to the at least one pipeline.

According to another aspect, an electronic apparatus is proposed which includes an electronic device as defined above, a camera configured to deliver the frames of image data to the at least one pipeline. According to an embodiment, the electronic apparatus further includes a display coupled to the display controller of the electronic device.

Figure 1:
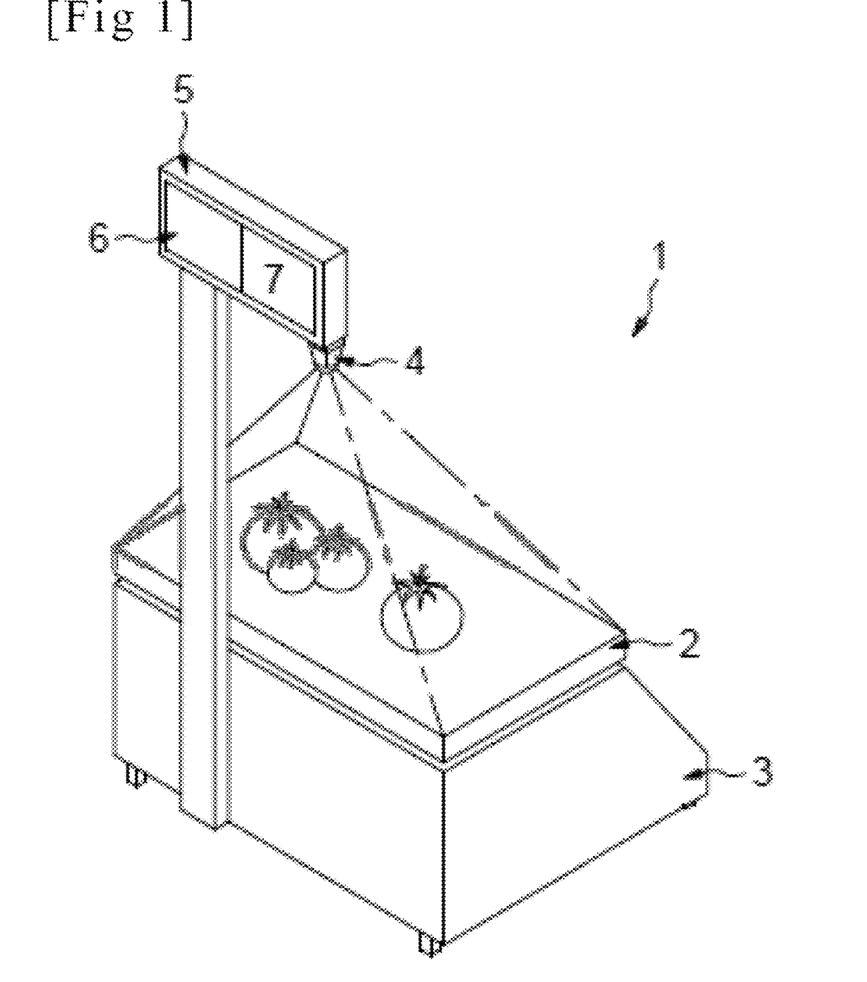
FIG. 1 schematically illustrates an embodiment of the invention.

The reference 1 in FIG. 1 designates an electronic apparatus such as a smart scale ("Smart Balance") for shops.

In an embodiment, the smart scale 1 includes a scale plate 2 intended to receive products to be weighed, for example fruit such as tomatoes; a scale 3 configured to determine the weight of the products placed on the scale plate 2; a camera 4 having a field of vision which covers the scale plate 2; a display 5 including at least one screen, in this case a screen 6 for example; and a processing system 7 coupled between the camera 4 and the display 5 and configured to process image data generated by the camera 4 such as to deliver images suitable for the display 5.

Figure 2:
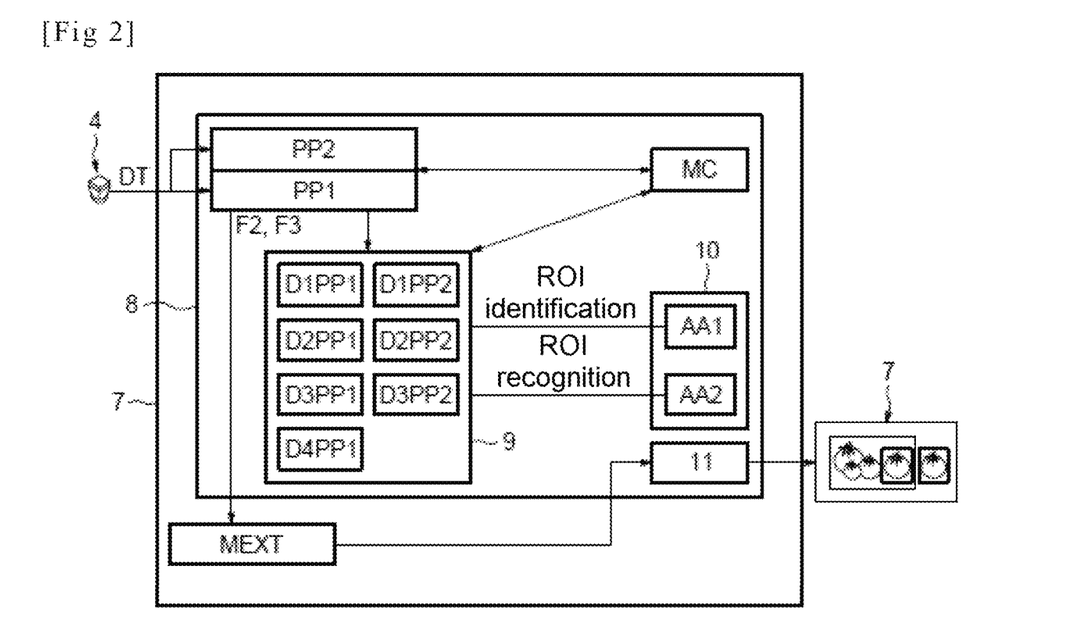
FIG. 2 schematically illustrates an embodiment of the invention.

Reference is now made to FIG. 2 in order to illustrate, in greater detail, an exemplary embodiment of the processing system 7. The processing system 7 comprises an electronic device 8, for example in this case a 32-bit microcontroller and external memories MEXT, of static random-access memory (SRAM) type for example. In some embodiments, electronic device 8 is disposed on an integrated circuit chip, which may include circuitry disposed on a single semiconductor substrate, such as a silicon substrate.

The electronic device 8 comprises at least one pipeline, in other words a processing chain, in this case for example a first pipeline PP1 and a second pipeline PP2; an internal memory 9, in this case for example also of the static random-access memory type, including, for each pipeline PP1, PP2, a set of descriptors, in this case, for example, four descriptors D1PP1, D2PP1, D3PP1, D4PP1 for the first pipeline PP1 and three descriptors D1PP2, D2PP2, D3PP2 for the second pipeline PP2; and controller MC, in this case, for example, a direct memory access (DMA) controller, which are coupled to the at least one pipeline PP1, PP2 and configured to control operations of the at least one pipeline PP1, PP2.

By way of example, this DMA controller can also be an integrated DMA controller dedicated to the at least one pipeline of the electronic device 8. Each pipeline PP1, PP2 is configured to receive, in pace with a frame rate DT, frames of image data to be processed. The frames of image data come from the camera 4. The frame rate DT is configurable such as to make it possible to adjust a duration allocated to the processing of each frame of image data. It should be noted that, in certain cases, the use of a single pipeline PP1 can already be suitable for the processing of the frames of image data.

In this case, the first and second pipelines PP1, PP2 are illustrated such as to show that the controller MC can be configured to control, in parallel, the first and second pipelines PP1, PP2 such as to respectively create "virtual" pipelines within the first and second pipelines PP1, PP2 in order to enhance the performance for processing the frames of image data.

The electronic device 8 further comprises processor 10 coupled to the first and second pipelines PP1, PP2 via the internal memory 9. The processor 10 is, for example, implemented in this case as an artificial neural network accelerator ("Artificial Neuron Network Accelerator") known to a person skilled in the art. In alternative embodiments, the processor 10 may be implemented, for example, other using circuitry configured to implement one or more neural networks including, but not limited to one or more neural processors, one or more digital signal processors (DSPs), a graphical processing unit (GPU), custom digital logic, or one or more microprocessors.

In an embodiment, the processor 10 is configured to possibly identify one or more regions of interest ROI in each frame of image data to be processed by using a first learning algorithm AA1, and recognize objects featuring in the identified area or areas of interest by using a second learning algorithm AA2. It should be noted that the first and second learning algorithms can be identical or different.

All of the known artificial neural networks such as the so-called "AlexNet" and "ConvNet" convolutional neural networks can be implemented by the processor 10 such as to improve the performance of the electronic device 8.

The electronic device 8 further comprises a display controller 11 coupled to the first and second pipelines PP1, PP2 via the external memories MEXT. The display controller 11 is configured to receive prediction image data coming from the first and second pipelines PP1, PP2 via the external memories MEXT and deliver them to the display 5 in order to show one or more prediction images on the display 5. In various embodiments, display 5 may include a screen, such as a LCD screen or other type of electronic display.

It should be noted that each pipeline PP1, PP2 can have as many corresponding descriptors as necessary. These corresponding descriptors are saved in the internal memory 9. In other words, the number of descriptors of each set of descriptors D1PP1, D2PP1, D3PP1, D4PP1, D1PP2, D2PP2, D3PP2 for each pipeline PP1, PP2 is not limited. The information of each descriptor relates to a pipeline function intended to be activated on a frame of image data. As a result, each pipeline PP1, PP2 can create as many so-called "virtual" pipelines as corresponding descriptors. In the example illustrated in FIG. 2, the four descriptors D1PP1, D2PP1, D3PP1, D4PP1 of the first pipeline PP1 correspond to four virtual pipelines PV1, PV2, PV3, PV4 created by the first pipeline PP1.

Figure 3:
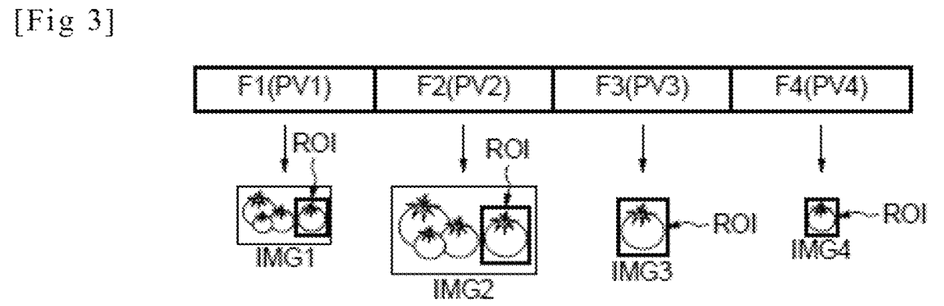
FIG. 3 schematically illustrates an embodiment of the invention.

Reference is now made to FIG. 3 in order to illustrate an example of operation of these four virtual pipelines PV1, PV2, PV3, PV4. Under the control of the controller MC, the first pipeline PP1 is configured to create the first virtual pipeline PV1 in which resizing and/or cropping of image data of a first frame F1 is carried out such as to deliver, to the internal memory 9, a first low-definition image IMG1, for example of 220 pixels×220 pixels, as illustrated in FIG. 3. This first image IMG1 is a low-definition image such as to be able to be stored in the internal memory 9 and facilitate subsequent processing for identification of areas of interest. By way of example, this first image IMG1 can, for example, be an image containing four tomatoes on the scale plate 2.

The controller MC is then configured to deliver this first image IMG1 to the processor 10. The processor 10 is configured to apply one or more neural network recognition algorithms suitable for identifying one or more regions of interest ROI in the first image IMG1, in this case, for example, a square region ROI around a tomato on the first image IMG1. The processor 10 is further configured to create the second virtual pipeline PV2 in which cropping of image data of a second frame F2 is carried out such as to deliver, to the internal memory 9, a second high-definition image IMG2. Assuming that the tomatoes on the scale plate 2 are stationary, the second image IMG2 can be a high-resolution version of the first image IMG1.

The controller MC is configured to create the third virtual pipeline PV3 in which resizing and cropping of image data of a third frame F3 are carried out such as to deliver, to the external memory MEXT, a third high-definition image IMG3 corresponding to the region of interest ROI identified by the processor 10. It should be noted that the information of the third descriptor of the first pipeline PP1 can, for example, be modified in this case on-the-fly by taking into account the results of the identification of the region of interest carried out by the processor 10.

The controller MC is configured to deliver these second and third images IMG2 and IMG3 to the display 5 via the external memory MEXT and the display controller 11. As illustrated in FIG. 2, these images IMG2 and IMG3 are illustrated separately on the screen 6.

Once the region of interest ROI has been identified, the controller MC is further configured to create the fourth virtual pipeline PV4 in which resizing and cropping of image data of a fourth frame F4 are carried out such as to deliver, to the processor 10, via the internal memory 9, a low-definition fourth image IMG4 corresponding to the region of interest ROI identified by the processor 10.

The processor 10 is then configured to recognize one or more objects featuring in the fourth image IMG4 using artificial neural network recognition algorithms.

Thus, a tomato is recognized in the fourth image IMG4 and the controller MC is configured to display the unit price of the tomato on the display 5 and possibly the total price taking into account the weight of the tomatoes that is measured by the scale 3.

Figure 4:
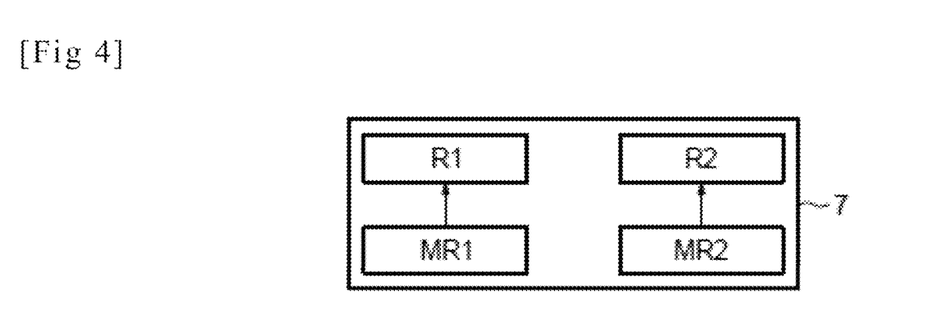
FIG. 4 schematically illustrates an embodiment of the invention.

Reference is now made to FIG. 4 in order to illustrate an exemplary embodiment of the controller MC. To read and store the information of the corresponding descriptors of each pipeline PP1, PP2, the controller MC further includes a first shadow memory MR1 and a first register R1 for the first pipeline PP1, and a second shadow memory MR2 and a second register R2 for the second pipeline PP2. The first and second shadow memories MR1, MR2 are commonly known to a person skilled in the art as "shadow memory or shadow register" in English.

As the name indicates, the first and second shadow memories MR1, MR2 are configured to track the first and second registers R1, R2 with regard to stored data. Indeed, the latency for transfer of data between the first or second shadow memory MR1 or MR2 and the corresponding first or second register R1 or R2 is extremely short, for example approximately a few microseconds.

Figure 5:
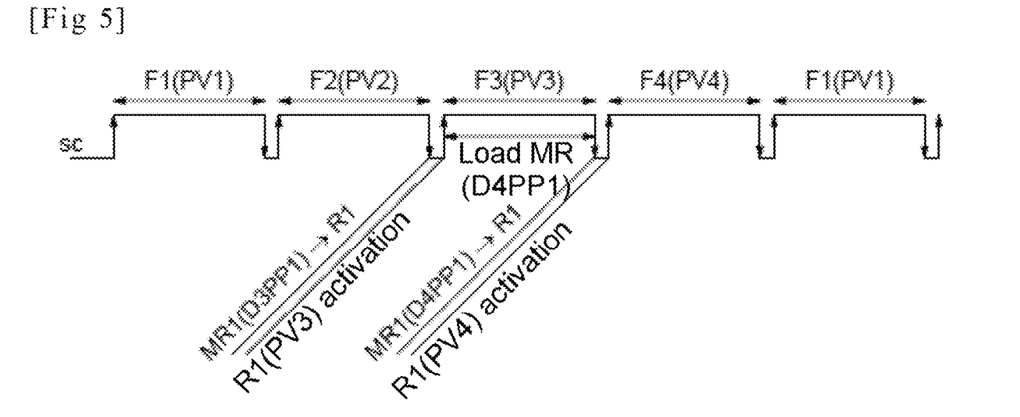
FIG. 5 schematically illustrates a mode of implementation and an embodiment of the invention.

FIG. 5 illustrates a time diagram for a control signal SC intended to be used to control the operation of the first and second shadow memories MR1, MR2 and of the first and second registers R1, R2. It is assumed in this example that a descriptor or virtual pipeline is valid for a single frame.

For the sake of simplification, only the operation of the first shadow memory MR1 and of the first register R1 corresponding to the first pipeline PP1 is illustrated in this case. As can be seen in FIG. 5, the first pipeline PP1 is intended to receive a control signal SC. Each falling edge of the control signal SC marks the end of a frame of image data and each rising edge of the control signal SC corresponds to the start of a frame of image data. As a result, it can be noted, in FIG. 5, that the four frames F1, F2, F3, F4 of image data correspond to the four virtual pipelines PV1, PV2, PV3, PV4 of the first pipeline PP1.

If it is assumed that the third frame F3 is currently being processed, the controller MC is configured to, for the first pipeline PP1, read, between the end of the previous frame of image data F2 and the end of the current frame of image data F3, the information of one of the descriptors in the first shadow memory MR1.

According to the first order ORD1 illustrated in FIG. 4, the first pipeline PP1 is configured to create the fourth virtual pipeline PV4 from the start of the fourth frame F4. As a result, it is the information of the fourth descriptor D4PP1 that must be read and stored in the first shadow memory MR1 between the end of the previous frame of image data F2 and the end of the current frame of data F3.

The controller MC is further configured to transfer the information of the fourth descriptor D4PP1 into the first register R1 from the end of the third frame of image data F3.

Finally, the corresponding pipeline, in this case the first pipeline PP1 is configured to activate the function corresponding to the information of the fourth descriptor D4PP1, in other words the fourth virtual pipeline PV4, from the start of the fourth frame F4.

As a result, a single pipeline can carry out different functions in pace with a frame rate. In other words, several virtual pipelines can be created using a single pipeline.

What is claimed is:

1. An image processing electronic device, comprising:
a pipeline configured to process frames of image data in pace with a frame rate;
an internal memory coupled to the pipeline, wherein a set of descriptors arranged according to an order is stored in the internal memory, each descriptor of the set of descriptors is associated with a corresponding function to be activated by the pipeline on at least one frame of image data, wherein a first function associated with a first descriptor of the set of descriptors is different from a second function associated with a second descriptor of the set of descriptors; and
a controller comprising a shadow memory and a register, the controller configured to:
read each descriptor of the set of descriptors sequentially and cyclically according to the order at a rate of at least one descriptor per one frame of image data,
store information corresponding to each read descriptor, wherein the pipeline is configured to activate on each frame of image data, a function associated with each read descriptor based on the stored information,
read, between an end of a previous frame of image data and an end of a current frame of image data, the first descriptor of the set of descriptors,
store the information corresponding to the first descriptor in the shadow memory, and transfer the stored information corresponding to the first descriptor from the shadow memory to the register, at the end of the current frame of image data, wherein the pipeline is further configured to activate the first function associated with the first descriptor based on the transferred stored information in the register from a start of a next frame of image data.

2. The device according to claim 1, wherein:
the pipeline comprises a plurality of pipelines;
the controller includes a shadow memory and a register for each pipeline of the plurality of pipelines; and
the set of descriptors comprises a plurality of sets of descriptors.

3. The device according to claim 1, wherein the controller comprises a direct memory access controller.

4. The device according to claim 3, wherein the direct memory access controller is an integrated controller dedicated to the pipeline.

5. The device according to claim 1, wherein the frame rate is configurable.

6. The device according to claim 1, wherein a number of descriptors of each set of descriptors the order is configurable.

7. The device according to claim 1, further including a processor coupled to the pipeline, wherein the processor is configured to implement one or more artificial neural networks coupled to the pipeline.

8. The device according to claim 1, further comprising display controller coupled to the pipeline.

9. The device according to claim 8, further including a display coupled to the display controller.

10. An electronic apparatus including an electronic device according to claim 1, and a camera configured to deliver the frames of image data to pipeline.

11. A method, comprising:
receiving frames of image data by a pipeline;
reading descriptors of a set of descriptors sequentially and cyclically according to an order from an internal memory, wherein each descriptor of the set of descriptors is associated with a function of a set of functions, and reading the descriptors comprises reading a first descriptor of the set of descriptors between an end of a previous frame of the image data and an end of a current frame of the image data;
sequentially and cyclically storing information corresponding to each read descriptor of the set of descriptors, wherein storing the information comprises storing the information related to the first descriptor in a shadow memory;
transferring the stored information related to the first descriptor from the shadow memory to a register at the end of the current frame of the image data; and
configuring the pipeline to perform a function associated with the read descriptor on each frame of the image data comprising configuring the pipeline to perform a function associated with the first descriptor based on the transferred stored information related to the first descriptor stored in the register from a start of a next frame of the image data.

12. The method of claim 11, wherein functions of the set of functions comprise at least one of:
a first function configured to cause the pipeline to resize or crop a first frame of the image data to produce a first image having a first resolution;
a second function configured to cause the pipeline produce an second image having a second resolution higher than the first resolution based on the first frame of the image data;
a third function configured to cause the pipeline to crop the first frame of the image data to form a third image showing a region of interest (ROI), wherein the third image has a third resolution; or
a fourth function configured to cause the pipeline to crop the first frame of the image data to form a fourth image showing the ROI, wherein the fourth image has a fourth resolution lower than the third resolution.

13. The method of claim 12, wherein:
the first function is further configured to cause the pipeline to write the first image to the internal memory;
the second function is further configured to cause the pipeline to write the second image to an external memory; and
the fourth function is configured to cause the pipeline to write the fourth image to the internal memory.

14. The method of claim 12, further comprising:
identifying the ROI from the first image using a first learning algorithm; and
recognizing at least one object in the ROI from the fourth image using a second learning algorithm.

15. The method of claim 14, wherein the first learning algorithm and the second learning algorithm are neural network algorithms.

16. An image processing system comprising:
an integrated circuit, comprising
a pipeline circuit having an input configured to be coupled to an output of a camera, and configured to be coupled to an external memory;
an internal memory coupled to the pipeline circuit;
a controller coupled to the pipeline circuit and to the internal memory, the controller configured to cause the pipeline circuit to create a plurality of scheduled virtual pipelines by sequentially reading descriptors stored in the internal memory, wherein
a first virtual pipeline is configured to generate a first image based on a frame of image data, and store the first image in the internal memory, and
a second virtual pipeline is configured to generate a second image based on the frame of image data, and write the second image to the external memory, wherein a resolution of the first image is less than a resolution of the second image, wherein the second virtual pipeline is implemented using the same hardware as the first virtual pipeline; and
a processor coupled to the internal memory, wherein the processor configured to implement a neural network, and the neural network is configured to perform apply a neural network recognition algorithm to the stored first image in the internal memory.

17. The image processing system of claim 16, wherein the integrated circuit further comprises a display controller configured to be coupled to the external memory.

18. The image processing system of claim 17, further comprising the external memory.

19. The image processing system of claim 18, further comprising the camera, and a display coupled to the display controller.

20. The image processing system of claim 16, wherein
the controller includes a shadow memory and a register;
the controller is further configured to:
read, between an end of a previous frame of image data and an end of a current frame of image data, a first descriptor of the descriptors,
store information corresponding to the first descriptor in the shadow memory, and
transfer the stored information corresponding to the first descriptor from the shadow memory to the register, at the end of the current frame of image data; and
the pipeline circuit is configured to activate a function associated with the first descriptor based on the transferred stored information in the register from a start of a next frame of image data.

* * * * *